United States Patent
Hecht

(10) Patent No.: US 8,882,413 B2
(45) Date of Patent: Nov. 11, 2014

(54) CUTTING TOOL AND CUTTING INSERT WITH A REARWARD RESILIENCE SLIT

(71) Applicant: Iscar, Ltd., Tefen (IL)

(72) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 253 days.

(21) Appl. No.: 13/684,947

(22) Filed: Nov. 26, 2012

(65) Prior Publication Data

US 2014/0147224 A1     May 29, 2014

(51) Int. Cl.
    *B23B 51/02*            (2006.01)

(52) U.S. Cl.
    CPC ............. *B23B 51/02* (2013.01); *B23B 2251/02* (2013.01); *B23B 2240/32* (2013.01)
    USPC .......................................... 408/231; 408/226

(58) Field of Classification Search
    CPC ....................................................... B23B 51/02
    USPC ........... 408/44, 226, 227, 230, 231, 233, 713, 408/144
    See application file for complete search history.

(56) References Cited

U.S. PATENT DOCUMENTS

| | | | |
|---|---|---|---|
| 5,228,812 A | 7/1993 | Noguchi et al. | |
| 5,749,689 A | 5/1998 | Konig | |
| 6,142,486 A * | 11/2000 | Cedarberg, III | ............. 279/103 |
| 6,485,235 B1 | 11/2002 | Mast et al. | |
| 6,582,164 B1 | 6/2003 | McCormick | |
| 6,783,308 B2 * | 8/2004 | Lindblom | ..................... 408/230 |
| 7,048,480 B2 | 5/2006 | Borschert et al. | |
| 2003/0219321 A1 * | 11/2003 | Borschert et al. | ............. 408/230 |
| 2010/0143059 A1 | 6/2010 | Hecht | |
| 2010/0155144 A1 | 6/2010 | Cramer et al. | |
| 2010/0322731 A1 * | 12/2010 | Aare | .............................. 408/226 |
| 2013/0266389 A1 * | 10/2013 | Hecht | ........................... 408/229 |
| 2013/0266390 A1 * | 10/2013 | Hecht et al. | ................... 408/231 |

* cited by examiner

*Primary Examiner* — Daniel Howell
*Assistant Examiner* — Nicole N Ramos
(74) *Attorney, Agent, or Firm* — Womble Carlyle

(57) ABSTRACT

A cutting insert has a head portion and a coupling portion protruding rearwards from the head portion, along a longitudinal insert axis. The head portion has a base surface at a rearward end thereof, defining a base plane, and two major surfaces. A coupling portion rear surface is longitudinally spaced apart from the base surface and a cylindrical coupling peripheral surface extends between the coupling portion rear surface and the base surface. A resilience slit has two opposite inner walls converging forwards towards a slit inner end terminating at a slit inner end plane. The slit inner end plane is parallel to the base plane and spaced apart therefrom by a longitudinal distance. The inner walls of the resilience slit form an acute slit angle therebetween.

22 Claims, 6 Drawing Sheets

CUTTING TOOL AND CUTTING INSERT WITH A REARWARD RESILIENCE SLIT

FIELD OF THE INVENTION

The present invention relates to cutting tools, in which a cutting insert is resiliently and removably self-clamped in a tool shank holder, in general, and to a cutting insert having a rearward resilience slit for mounting into such a holder, in particular.

BACKGROUND OF THE INVENTION

Cutting tools, and in particular drills, may include a cutting insert or cutting head which is removably secured in a tool holder, either by a fastening member (e.g., a screw), or by a resilience force. The cutting insert is fastened to the tool holder prior to operation in metal cutting, such as drilling. The cutting insert is typically made of a hard metal, such as cemented carbide or cermet. The tool holder may be made of steel, or also of a hard material, such as cemented carbide or cermet. Examples of such cutting tools and cutting inserts are disclosed in U.S. Pat. No. 5,228,812, U.S. Pat. No. 5,749,689, U.S. Pat. No. 6,485,235, U.S. Pat. No. 6,582,164, U.S. Pat. No. 7,048,480, US2010/155144 and US2010/143059.

It is an object of the subject matter of the present application to provide an improved novel drill cutting insert having a single resilience slit in the coupling portion thereof, for resilient self-clamping into a compatible tool shank holder.

SUMMARY OF THE INVENTION

In accordance with the subject matter of the present application, there is provided a cutting insert having a longitudinal insert axis extending in a forward to rearward direction, the cutting insert comprising a head portion and a coupling portion.

The head portion has two opposing major surfaces and a head peripheral surface extending therebetween, the head peripheral surface including a base surface at a rearward end of the head portion, the base surface defining a base plane perpendicular to the insert axis, each of the major surfaces intersecting with the base surface at a respective first intersection.

The coupling portion protrudes rearwards from the base surface along the insert axis. The coupling portion has a rear surface spaced apart from the base surface along the insert axis and a cylindrical coupling peripheral surface extending therebetween. The coupling peripheral surface intersects with the base surface at a transition area.

The coupling portion also includes a resilience slit extending from the rear surface in the forward direction, and opening out to the coupling peripheral surface. The resilience slit has two opposite inner walls converging in the forward direction towards a slit inner end which terminates at a slit inner end plane perpendicular to the insert axis.

The slit inner end plane is spaced apart from the base plane by a longitudinal distance and the inner walls of the resilience slit form a first acute slit angle therebetween.

Also in accordance with the subject matter of the present application is a cutting tool having a tool shank, with the aforementioned cutting insert resiliently secured to the tool shank by an interference fit.

BRIEF DESCRIPTION OF THE DRAWINGS

For a better understanding of the present invention and to show how the same may be carried out in practice, reference will now be made to the accompanying drawings, in which.

Figure 1:
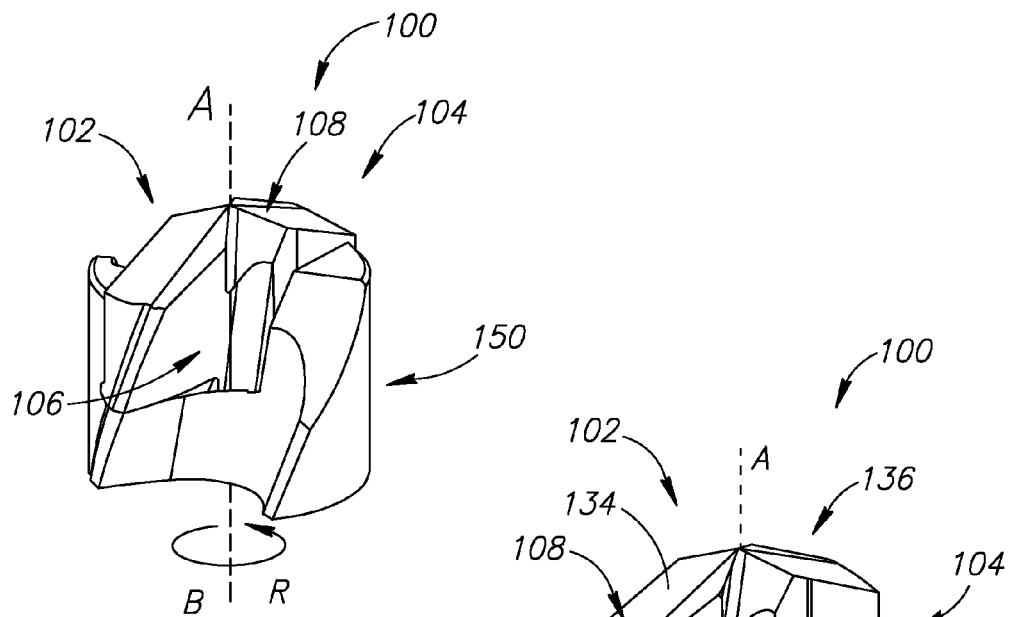
FIG. 1 is a perspective view of a cutting tool according to the present invention, in an assembled position.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well-known features may be omitted or simplified in order not to obscure the present invention.

Figure 2:
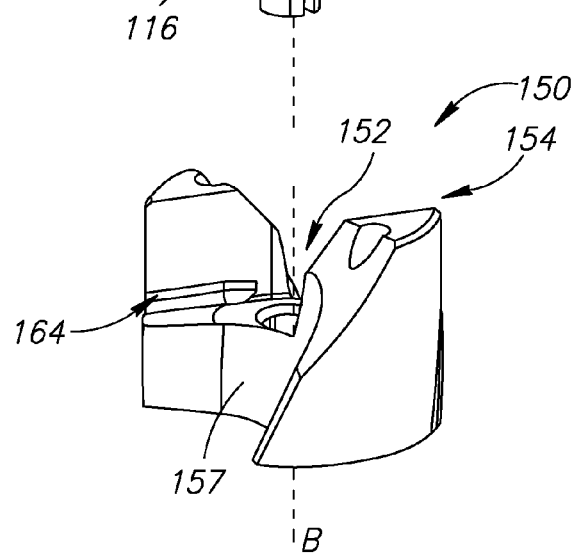
FIG. 2 is a perspective view of the cutting tool of FIG. 1, in a disassembled position.

Reference is made to FIGS. 1 and 2, depicting a cutting tool 100 in accordance with an embodiment of the present invention. The cutting tool 100 is a rotary cutting tool, such as a drill, having an axis of rotation B. The cutting tool 100 includes a tool shank 150 and a cutting insert 102, the cutting insert 102 removably mounted in a resilient self-clamping manner on the tool shank 150. The cutting tool 100 rotates about the axis of rotation B in a direction of rotation R.

The cutting insert 102 may be of the sort used in metal cutting operations and thus can be termed a metal cutting insert, meaning that the cutting insert may be used for cutting metal, not necessarily that the cutting insert is made of metal. In preferred embodiments, the cutting insert 102 is formed of hard metal, such as cemented carbide or cermet, and is employed for drilling or other metal cutting operations, sometimes also referred to as chip removing operations.

Figure 3:
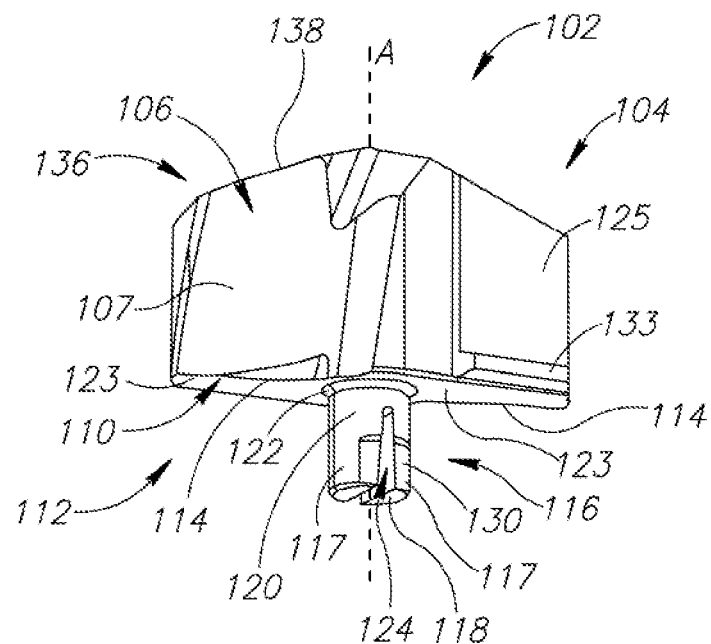
FIG. 3 is a perspective view of the cutting insert of the cutting tool of FIG. 1.
Figure 4:
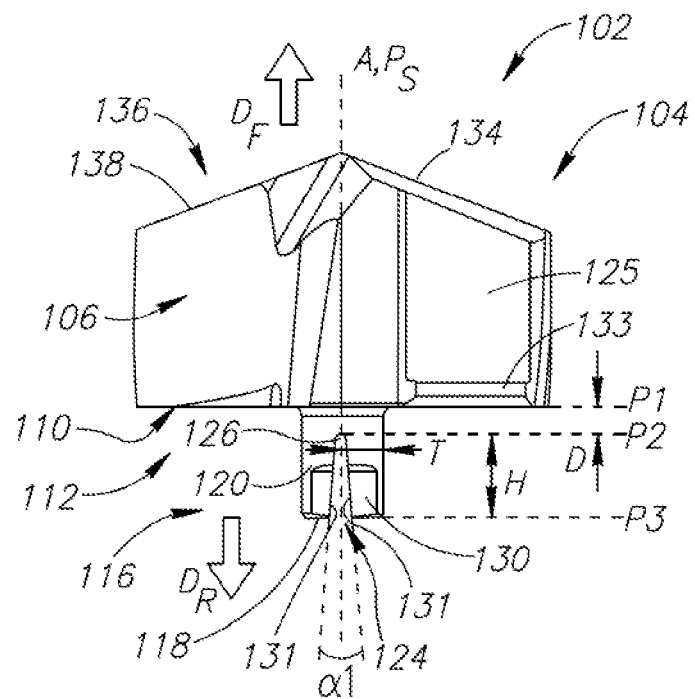
FIG. 4 is a side view of the cutting insert of FIG. 3.
Figure 5:
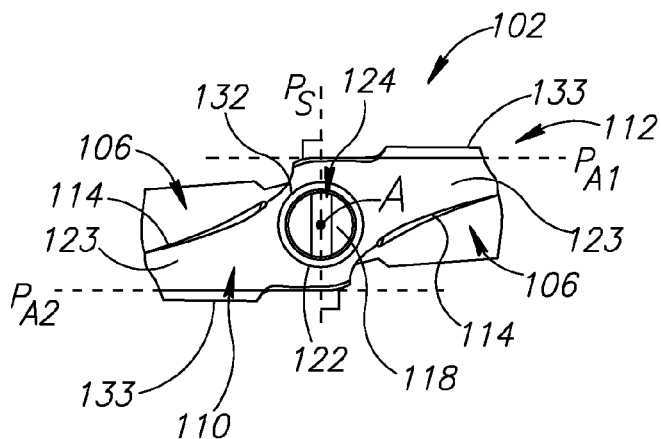
FIG. 5 is a rear view of the cutting insert of FIG. 3.

With further reference to FIGS. 3-5, different views of the cutting insert 102 are shown. The cutting insert 102 has a longitudinal insert axis A extending in a forward to rearward direction $D_F$, $D_R$. The cutting insert 102 has a head portion 104 and a coupling portion 116. The head portion 104 has a rearward end 112 and a forward end 136. The head portion 104 includes two opposing major surfaces 106 and a head peripheral surface 108 extending therebetween. The head peripheral surface 108 includes a base surface 110 at the rearward end 112 of the head portion 104. The base surface 110 defines a base plane P1 extending perpendicular to the insert axis A. Each of the major surfaces 106 intersect with the base surface 110 at a respective first intersection 114.

The head peripheral surface 108 further includes a forward surface 134 at the forward end 136 of the head portion 104. Each of the major surfaces 106 intersects with the forward surface 134. A portion of each such intersection forms a respective major cutting edge 138 at the forward end 136 of the head portion 104. An insert flute surface 107 extends rearwards from each of the cutting edges 138, on the respective major surface 106.

The base portion 110 includes two insert transverse abutment surfaces 123, extending perpendicular to, and symmetrically around the insert axis A. Each of the major surfaces 106 further includes an insert radial abutment surface 125, extending along the insert axis A. Each insert radial abutment surface 125 extends from the head peripheral surface 108 towards the insert axis A and the base surface 110, such that the two insert radial abutment surfaces 125 are arranged symmetrically around the insert axis A. A retaining ledge 133 extends circumferentially from the rearward end of each of the insert radial abutment surfaces 125, along a portion of the respective insert transverse abutment surface 123.

The coupling portion 116 protrudes rearwards from the base surface 110 along the insert axis A. The coupling portion 116 comprises a rear surface 118 spaced apart from the base surface 110. A cylindrical coupling peripheral surface 120 extends between the rear surface 118 and the base surface 110, forming a cylindrical envelope to the coupling portion 116. The coupling peripheral surface 120 is coupled with the base surface 110 at a circumferential transition area 122. The transition area 122 is spaced apart from the first intersections 114. Therefore, as depicted in FIG. 5, the transition area 122 is entirely surrounded by the base surface 110 and has a substantially circular boundary 132.

The coupling portion 116 also comprises a resilience slit 124 extending from the rear surface 118 in the forward direction $D_F$, opening out to the coupling peripheral surface 120. The resilience slit 124 has two opposite inner walls 131, converging in the forward direction $D_F$ towards a slit inner end 126 which terminates at a slit inner end plane P2 extending perpendicular to the insert axis A. The slit inner end plane P2 is spaced apart from the base plane P1 by a longitudinal distance D, such that the resilience slit 124 ends in the coupling portion 116 and does not extend further into the head portion 104 of the cutting insert 102. In this manner, all of the resilient self-clamping of the cutting insert 102 occurs in the coupling portion 116, and in particular adjacent the rear surface 118 thereof. This provides stability to the head portion 104, and in particular to the transition area 122, which is particularly susceptible to side-forces acting on the cutting insert 102 during machining operations. Further, due to the longitudinal distance D, a cross section of the coupling portion 116 taken perpendicular to the insert axis A, between the slit inner end plane P2 and the base plane P1, has a full undivided cross section 128 (e.g., a circular or elliptical cross section). This is shown in the cross section of FIG. 12, as will be elaborated herein below.

The rear surface 118 of the coupling portion 116 defines an end plane P3 extending perpendicular to the insert axis A. The resilience slit 124 has a longitudinal slit length H between the end plane P3 and the slit inner end plane P2. The longitudinal distance D is typically smaller than the longitudinal slit length H.

The resilience slit 124 divides the coupling portion 116 into two coupling legs 117. As shown in FIG. 5, a resilience slit plane $P_S$ passes through the resilience slit 124, substantially centrally between the coupling legs 117, such that the coupling legs 117 are mirror-symmetric about the resilience slit plane $P_S$. The resilience slit plane $P_S$ includes the insert axis A. The insert radial abutment surfaces 125 define first and second radial abutment planes $P_{A1}$, $P_{A2}$, which are parallel to one another and to the insert axis A. The resilience slit plane $P_S$ is perpendicular to the first and second radial abutment planes $P_{A1}$, $P_{A2}$. The resilience slit 124 allows the coupling portion 116 to be elastically deformed, such that each of the coupling legs 117 approaches the insert axis A, when sufficient force is applied on the coupling peripheral surface 120 in the direction of the resilience slit plane $P_S$.

FIG. 4 depicts a side view of the cutting insert 100 viewed along the resilience slit plane $P_S$, when the cutting insert 100 is in its neutral position (i.e., not mounted into the cutting tool holder 150). This side view shows that the inner walls 131 of the resilience slit 124 form a first acute slit angle α1 therebetween, expanding from the slit inner end 126 toward the rear surface 118. This forms a rearwards V-shape of the resilience slit 124. As also seen in FIG. 4, each coupling leg 117 has a thickness T in a direction perpendicular to the resilience slit plane $P_S$, which thickness T decreases in the direction towards the rear surface 118.

Figure 10:
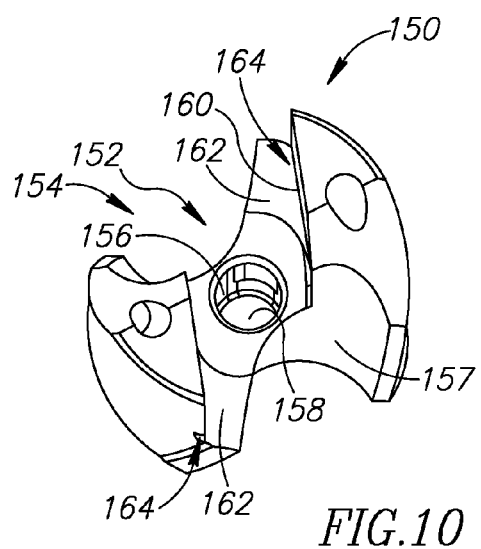
FIG. 10 is a front perspective view of the tool shank of the cutting tool of FIG. 1.
Figure 12:
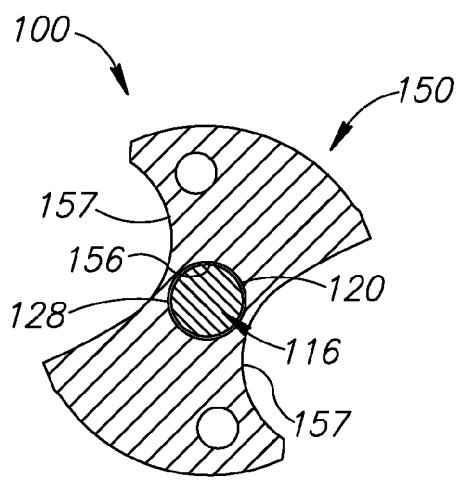
FIG. 12 is a cross section of the cutting tool of FIG. 11, along the cutting line XII-XII.
Figure 13:
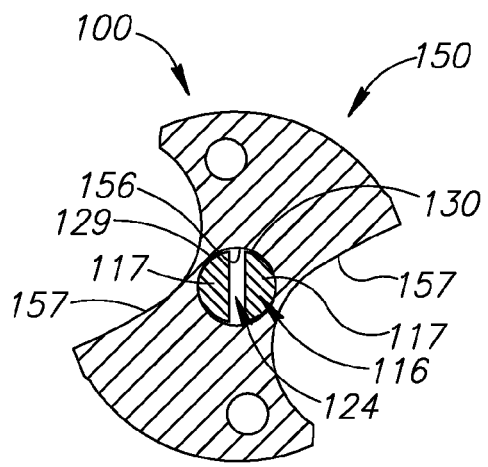
FIG. 13 is a cross section of the cutting tool of FIG. 11, along the cutting line XIII-XIII.

As depicted in FIG. 2, the tool shank 150 has a generally cylindrical shape, having a shank forward end 154 with a receiving portion 152. With further reference to FIG. 10, the tool shank 150 is depicted in a perspective front view. The receiving portion 152 includes a rearmost receiving portion base 158, and a receiving portion peripheral surface 156. The receiving portion peripheral surface 156 extends from the rearmost receiving portion base 158 in the forward direction $D_F$, circumferentially about the axis of rotation B. The receiving portion peripheral surface 156 may have a substantially cylindrical cross section. Alternatively, the receiving portion peripheral surface 156 may have another shape, which is not necessarily cylindrical. With reference to FIGS. 12 and 13, the receiving portion peripheral surface 156 is shown to have a substantially cylindrical cross section.

The tool shank 150 further includes two shank radial abutment surfaces 160, located at the shank forward end 154, and extending parallel to the axis of rotation B. The shank radial abutment surfaces 160 are arranged symmetrically about the axis of rotation B. The tool shank 150 also includes two shank transverse abutment surfaces 162, each extending from a respective one of the shank radial abutment surface 160, perpendicular to the axis of rotation B. A retaining undercut 164 is formed between each of the shank transverse abutment surfaces 162 and the respective radial abutment surface 160, for receiving one of the retaining ledges 133 of the cutting insert 102.

The tool shank 150 also includes two shank flute portions 157, arranged at the circumference of the tool shank 150 symmetrically about the axis of rotation B. During metal cutting operations, metal chips removed from the work-piece are directed to flow from the cutting edges 138 of the cutting insert 102 along the insert flute surfaces 107, and further into the shank flute portions 157, thereby being evacuated from the cutting area.

Figure 6:
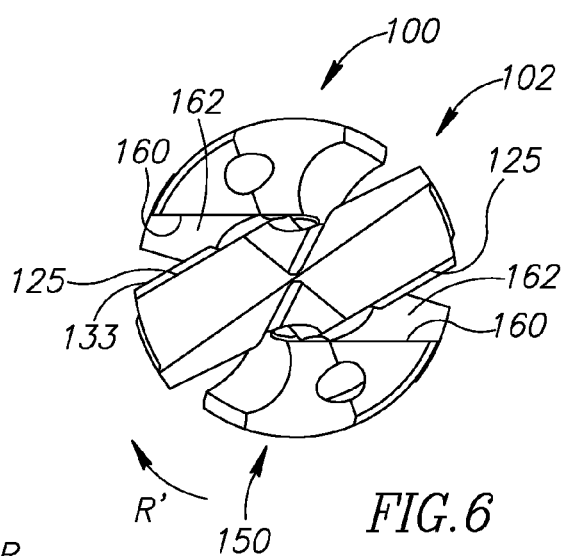
FIG. 6 is a front view of the cutting tool of FIG. 1, in a partially assembled position.
Figure 7:
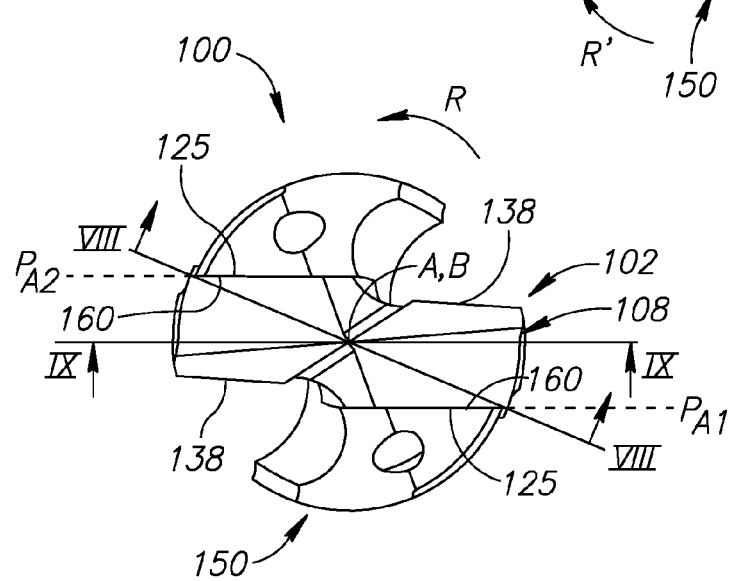
FIG. 7 is a front view of the cutting tool of FIG. 1, in the assembled position.
Figure 8:
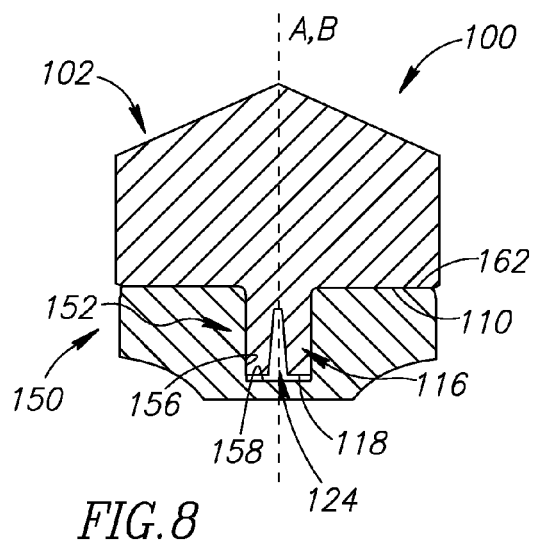
FIG. 8 is a cross section of the cutting toll of FIG. 7, along the cutting line VIII-VIII.
Figure 9:
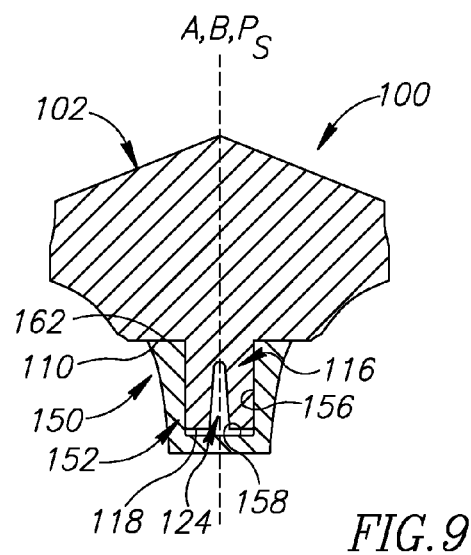
FIG. 9 is a cross section of the cutting toll of FIG. 7, along the cutting line IX-IX.

Reference is further made to FIGS. 6 and 7, depicting top views of the cutting tool 100 in a partially assembled position and assembled position, respectively. FIGS. 8 and 9 are cross sections of the cutting tool 100 in the assembled position, according to the cutting lines VIII-VIII and IX-IX, respectively, noted in FIG. 7. The cross section of FIG. 8 passes through the intersections of the head peripheral surface 108 with the insert radial abutment surfaces 125, and through the insert axis A. The cutting line IX-IX includes the insert axis A, and extends parallel to the radial abutment planes $P_{A1}$, $P_{A2}$.

The cutting insert 102 is configured to be mounted on the tool shank 150 and securely affixed thereto in order to reach the assembled position, shown for example in FIGS. 1 and 7. The assembled position is suitable for employing the cutting tool 100 in metal cutting operations, such as drilling. In the disassembled position shown in FIG. 2, the cutting insert 102 and the tool shank 150 are separated from one another. With the insert axis A aligned with the axis of rotation B, the cutting insert 102 and the tool shank 150 are brought together until the coupling portion 116 is located in the receiving portion 152, in a partially assembled position (FIG. 6). From the partially assembled position, the cutting insert 102 is rotated about the insert axis A, relative to the tool shank 150, in an assembling direction R', opposite the direction of rotation R, until reaching the assembled position, shown for example in FIGS. 2 and 7. In this position, the cutting insert 102 is resiliently secured to the shank forward end 154 by an interference fit applied between the coupling peripheral surface 120 and the receiving portion peripheral surfaces 156. In the partially assembled and assembled positions, the insert axis A coincides with the axis of rotation B. Further, in the partially assembled and assembled positions, the coupling portion 116 of the cutting insert 102 is entirely confined within the receiving portion 152 of the tool shank 150 (i.e., the coupling portion is not visible when observing the assembled cutting tool 100).

Figure 11:
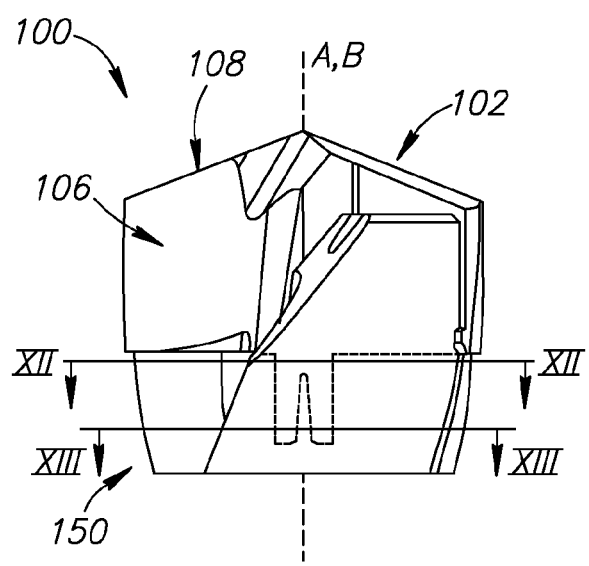
FIG. 11 is a partially transparent side view of the cutting tool of FIG. 1.

Reference is further made to FIG. 11, depicting a side view of the cutting tool 100 of FIG. 2. The outline of the hidden parts of the cutting insert 102, in this view, is depicted in dashed lines. FIGS. 12 and 13 depict cross sections of the cutting tool 100, according to the cutting lines XII-XII and XIII-XIII, respectively, noted in FIG. 11. The cutting line of FIG. 12 passes between the base surface 110 and the slit inner end 126 of the cutting insert 102, perpendicular to the insert axis A. The cross section of the coupling portion 116, in this longitudinal location, is the full undivided cross section 128.

The cross section of FIG. 13 passes forwards from, and adjacent to the rear surface 118 of the cutting insert 102, perpendicular to the insert axis A. This cross section demonstrates the interference fit between the coupling peripheral surface 120 and the receiving portion peripheral surface 156.

In the assembled position, each one of the insert radial abutment surfaces 125 of the cutting insert 102 abuts a respective one of the shank radial abutment surfaces 160 of the tool shank 150. Each one of the insert transverse abutment surfaces 123 abuts a respective one of the shank transverse abutment surfaces 162. Further, in the assembled position, each flute portion 157 of the tool shank 150 forms a continuous extension of the respective insert flute surface 107 of the cutting insert 102. The retaining ledges 133 of the cutting insert 102 are received within the retaining undercuts 164 of the tool shank 150. If a forward force is applied on the cutting insert 102, acting to pull the cutting insert 102 out of the tool shank 150, the retaining ledges 133 are stopped by the retaining undercuts 164, thereby preventing the cutting insert 102 from being pulled out. In the assembled position, the rear surface 118 of the cutting insert 102 is spaced apart from the receiving portion base 158, as shown in the cross-sections of FIGS. 8 and 9.

The coupling portion 116 and the receiving portion 152 are designed to have an interference fit between them so that in the assembled position the coupling portion 116 is secured in the receiving portion 152. Such an interference fit is achieved by the diameter of the coupling peripheral surface 120 being larger than the diameter of the receiving portion peripheral surface 156, at least in a portion of the circumference thereof. The coupling peripheral surface 120 may include two opposite indents 130, arranged symmetrically about the insert axis A. The indents 130 are formed in the coupling peripheral surface 120, and extend from the rear surface 118 in the forward direction $D_F$. FIG. 13 shows that the indents 130 reduce the diameter of the coupling peripheral surface 120, forming an elliptical cross section 129 of the coupling portion 116.

The resilience slit 124 provides elasticity to the coupling portion 116 enabling the diameter of the coupling portion peripheral surface 120 (that is, the diameter in any cross section of the coupling portion 116 taken perpendicular to the insert axis A), to be made smaller by applying an interference force from both sides of the resilience slit 124. By applying such a force, the coupling portion 116 is elastically deformed and the coupling legs 117 are urged towards one another, and towards the resilience slit plane $P_S$. A resilience force urges the coupling legs 117 apart to their original neutral position, thereby pressing the coupling peripheral surface 120 against the receiving portion peripheral surfaces 156.

In the embodiment depicted in the drawings, each of the indents 130 extends on both sides of the resilience slit 124, over the opening of the resilience slit 124 to the coupling peripheral surface 120. This is to ensure that the interference fit occurs such that the interference force is applied perpendicular to the resilience slit plane $P_S$, so as to press the coupling legs 117 towards the resilience slit plane $P_S$.

When the cutting tool 100 is employed in metal cutting, it rotates in the direction of rotation R, and a reverse force is applied on the cutting insert 102, in the opposite direction R'. This reverse force further assists in maintaining the cutting insert 102 clamped tight within the tool shank 150 during operation.

The cutting insert 102 may be removed from the tool shank 150, for example, when the cutting edges 138 have worn out and the cutting insert 102 needs to be replaced. In order to remove the cutting insert 102, it is rotated about the insert axis A, relative to the tool shank 150, in the direction of rotation R, until reaching the partially assembled position (FIG. 6). Then, the cutting insert 102 and the tool shank 150 are pulled apart until arriving at the disassembled position (FIG. 2).

Figure 14:
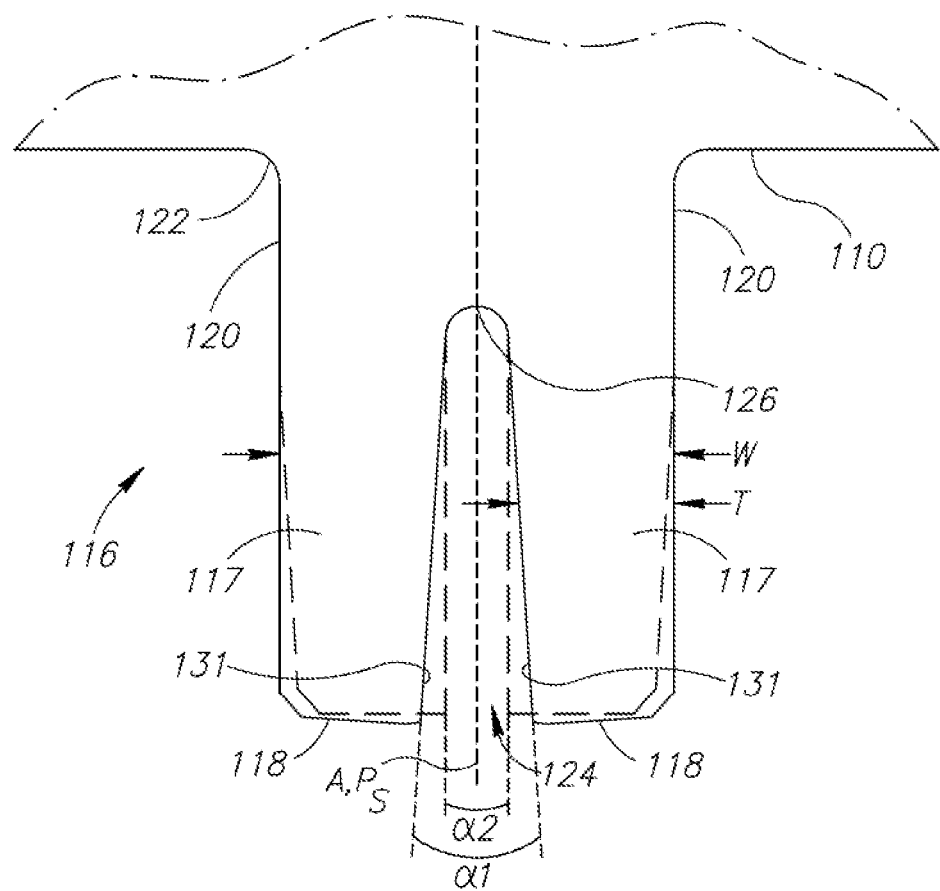
FIG. 14 is a side view of the coupling portion of the cutting insert of FIG. 3, in its neutral position and in the assembled position.

Reference is further made to FIG. 14, schematically depicting partial side views of the coupling portion 116, taken along the insert axis A, when the coupling portion 116 is in the neutral position (shown in solid lines) and the assembled position (shown in dashed lines). The displacement towards the resilience slit plane $P_S$ in the coupling portion 116 is evident when comparing the assembled position with the neutral position. As shown in FIG. 14, and according to results of mechanical analysis of the cutting tool 100, the largest displacement was recorded at, or immediately adjacent, the rear surface 118, in each of the coupling legs 117. The displacement decreased when approaching the slit inner end 126, and no displacement was recorded between the slit inner end 126 and the base surface 110, and in particular at the transition area 122.

The coupling portion 116 has a coupling portion width W extending between the coupling peripheral surface 120, on opposite sides of the insert axis A. In the neutral position, the coupling portion width W is substantially constant, along the coupling portion 116. In the assembled position, the coupling portion width W decreases when approaching the rear surface 118 from the slit inner end 126. The coupling portion width W remains constant between the slit inner end 126 and the transition area 122, both in the assembled position and in the neutral position.

As noted above, the slit inner end 126 is spaced apart from the base surface 110, (i.e., the slit inner end plane P2 is spaced apart from the base plane P1), making the cross section of the coupling portion 116 at that region, the full undivided cross section 128. Further, in the neutral position, the inner walls 131 of the resilience slit 124 form the first acute slit angle α1 expanding towards the rear surface 118, such that the thickness T of each coupling leg 117 taken in a direction perpendicular to the resilience slit plane $P_S$ narrows down toward the rear surface 118. In the assembled position, the coupling legs 117 are displaced toward each other, on opposite sides of the resilience slit plane $P_S$, causing the inner walls 131 of the resilience slit 124 to form a second slit angle α2 therebetween, the second slit angle α2 being smaller than the first acute slit angle α1. Due to these attributes, the displacement towards the resilience slit plane $P_S$ is the largest at the rear surface 118, while eliminated from the transition area 122 and its vicinity, thereby providing further durability to the transition area 122.

In a particular case of side-forces acting on a cutting insert during machining operations (e.g., angular drilling), the transition area may be particularly susceptible and prone to breakage and other mechanical damage. The suggested design of the cutting insert 102 according to the present invention provides better strength and durability of the transition area 122, thereby preventing such damage.

While the present invention has been described with reference to one or more specific embodiments, the description is intended to be illustrative as a whole and is not to be construed as limiting the invention to the embodiments shown. It is appreciated that various modifications may occur to those skilled in the art that, while not specifically shown herein, are nevertheless within the scope of the invention.

What is claimed is:
1. A cutting insert (102), having a longitudinal insert axis (A) extending in a forward ($D_F$) to rearward direction ($D_R$), comprising:
a head portion (104) having two opposing major surfaces (106) and a head peripheral surface (108) extending therebetween, the head peripheral surface (108) including a base surface (110) at a rearward end (112) of the head portion (104), the base surface (110) defining a base plane (P1) perpendicular to the insert axis (A); and
a coupling portion (116) protruding rearwards from the base surface (110) along the insert axis (A), the coupling portion (116) comprising:
a rear surface (118) spaced apart from the base surface (110) along the insert axis (A) and a cylindrical coupling peripheral surface (120) extending therebetween, the coupling peripheral surface (120) intersecting with the base surface (110) at a transition area (122); and
a resilience slit (124) extending from the rear surface (118) in the forward direction ($D_F$) and opening out to the coupling peripheral surface (120), the resilience slit (124) having two opposite inner walls (131) converging in the forward direction ($D_F$) towards a slit inner end (126) which terminates at a slit inner end plane (P2) perpendicular to the insert axis (A),
wherein:

the slit inner end plane (P2) is spaced apart from the base plane (P1) by a longitudinal distance (D); and
the inner walls (131) of the resilience slit (124) form a first acute slit angle (α1) therebetween.

2. The cutting insert (102) according to claim 1, wherein the rear surface (118) defines an end plane (P3) perpendicular to the insert axis (A) and the resilience slit (124) has a longitudinal slit length (H) between the end plane (P3) and the slit inner end plane (P2).

3. The cutting insert (102) according to claim 2, wherein the longitudinal distance (D) is smaller than the longitudinal slit length (H).

4. The cutting insert (102) according to claim 1, wherein a cross section of the coupling portion (116) taken perpendicular to the insert axis (A) between the slit inner end plane (P2) and the base plane (P1), is a full undivided cross section (128).

5. The cutting insert (102) according to claim 1, wherein the coupling peripheral surface (120) includes two opposite indents (130) arranged symmetrically about the insert axis (A).

6. The cutting insert (102) according to claim 1, wherein the transition area (122) has a substantially circular boundary (132), entirely surrounded by the base surface (110).

7. The cutting insert (102) of claim 1, wherein in a side view of the coupling portion (116) taken along the insert axis (A), a coupling portion width (W) extends between the coupling peripheral surface (120), on either side of the resilience slit (124), and in a neutral position of the coupling portion (116) the coupling portion width (W) is substantially constant, along the coupling portion (116).

8. The cutting insert (102) according to claim 1, wherein the head peripheral surface (108) further includes a forward surface (134) at a forward end (136) of the head portion (104), wherein a portion of the intersection of each of the major surfaces (106) with the forward surface (134) forms a respective major cutting edge (138).

9. The cutting insert (102) according to claim 1, wherein each of the major surfaces (106) has an insert radial abutment surface (125) extending from the head peripheral surface (108) towards the insert axis (A) and the base surface (110), the insert radial abutment surfaces (125) defining first and second radial abutment planes ($P_{A1}$, $P_{A2}$), parallel to one another and to the insert axis (A), and
the resilience slit (124) divides the coupling portion (116) into two coupling legs (117), and a resilience slit plane ($P_S$) passes substantially centrally between the coupling legs (117) and includes the insert axis (A), the resilience slit plane ($P_S$) being perpendicular to the first and second radial abutment planes ($P_{A1}$, $P_{A2}$).

10. The cutting insert (102) according to claim 1, wherein:
the coupling legs (117) are located on either side of a resilience slit plane ($P_S$) which passes between the coupling legs (117) and contains the insert axis (A);
each coupling leg (117) has a thickness (T) in a direction perpendicular to the resilience slit plane ($P_S$); and
the thickness (T) of each coupling leg (117) decreases in the direction toward the rear surface (118).

11. A cutting tool (100) having an axis of rotation (B) extending in a forward ($D_F$) to rearward direction ($D_R$), and around which the cutting tool (100) rotates in a direction of rotation (R), the cutting tool (100) comprising:
a tool shank (150) having a shank forward end (154) with a receiving portion (152), the receiving portion (152) comprising a receiving portion peripheral surface (156) extending circumferentially about the axis of rotation (B); and a cutting insert (102) according to claim 1,
wherein:
in an assembled position of the cutting tool (100), the cutting insert (102) is resiliently secured to the tool shank (150) by an interference fit applied between the coupling peripheral surface (120) and the receiving portion peripheral surface (156).

12. The cutting tool (100) of claim 11, wherein
the resilience slit (124) divides the coupling portion (116) into two coupling legs (117); and
the coupling legs (117) resiliently approach the insert axis (A), in the assembled position.

13. The cutting tool (100) of claim 11, wherein the receiving portion peripheral surface (156) is substantially cylindrical.

14. The cutting tool (100) of claim 11, wherein the receiving portion (152) includes a rearmost receiving portion base (158), and in the assembled position the rear surface (118) is spaced apart from the rearmost receiving portion base (158).

15. The cutting tool (100) of claim 11, wherein:
each of the major surfaces (106) has an insert radial abutment surface (125) extending from the head peripheral surface (108) towards the insert axis (A) and the base surface (110),
the tool shank (150) further includes two shank radial abutment surfaces (160), located at the shank forward end (154), extending parallel to, and arranged symmetrically about the axis of rotation (B), and
in the assembled position each head radial abutment surface (125) abuts a respective shank radial abutment surface (160).

16. The cutting tool (100) of claim 11, wherein:
the base portion (110) further includes two insert transverse abutment surfaces (123), extending perpendicular to, and symmetrically around the insert axis (A),
the tool shank (150) further includes two shank radial abutment surfaces (160), located at the shank forward end (154), extending parallel to, and arranged symmetrically about the axis of rotation (B),
the tool shank (150) further includes two shank transverse abutment surfaces (162), each extending from a respective one of the shank radial abutment surface (160), circumferentially and perpendicular to the axis of rotation (B), and
in the assembled position, each one of the head transverse abutment surfaces (123) abuts a respective one of the shank transverse abutment surfaces (162).

17. The cutting tool (100) of claim 11, wherein:
the cutting insert (102) further includes two retaining ledges (133), each extending circumferentially from the rearward end of a respective insert radial abutment surfaces (125), along a portion of the respective insert transverse abutment surface (123), and
the tool shank (150) further includes two retaining undercuts (164), each extending circumferentially from a respective shank transverse abutment surface (162), for receiving the retaining ledges (133) therein, in the assembled position.

18. The cutting tool (100) of claim 11, wherein:
the cutting insert (102) further includes two insert flute surfaces (107), each extending rearwards from a forward end (136) of the head portion (104), on the respective major surface (106),
the tool shank (150) further includes two shank flute portions (157), arranged symmetrically about the axis of rotation (B), and
in the assembled position, each of the shank flute portions (157) forms an extension of a respective insert flute surface (107).

19. The cutting tool (100) of claim 11, wherein in the assembled position, the insert axis (A) coincides with the axis of rotation (B).

20. The cutting tool (100) of claim 11, wherein in the assembled position, the coupling portion (116) of the cutting insert (102) is entirely confined within the receiving portion (152) of the tool shank (150).

21. The cutting tool (100) of claim 11, wherein:
in the side view of the coupling portion (116) a coupling portion width (W) extends between the coupling peripheral surface (120), on either side of the resilience slit (124),
in a neutral position of the coupling portion (116) the coupling portion width (W) is substantially constant, along the coupling portion (116), and
in the assembled position, the coupling portion width (W) decreases when approaching the rear surface (118) from the slit inner end (126).

22. The cutting tool (100) of claim 11, wherein in the assembled position, the inner walls (131) of the resilience slit (124) form a second slit angle ($\alpha 2$) therebetween, the second slit angle ($\alpha 2$) being smaller than the first acute slit angle ($\alpha 1$).

* * * * *